(No Model.) 2 Sheets—Sheet 1.
A. C. WHITTIER.
DREDGE.
No. 322,231. Patented July 14, 1885.
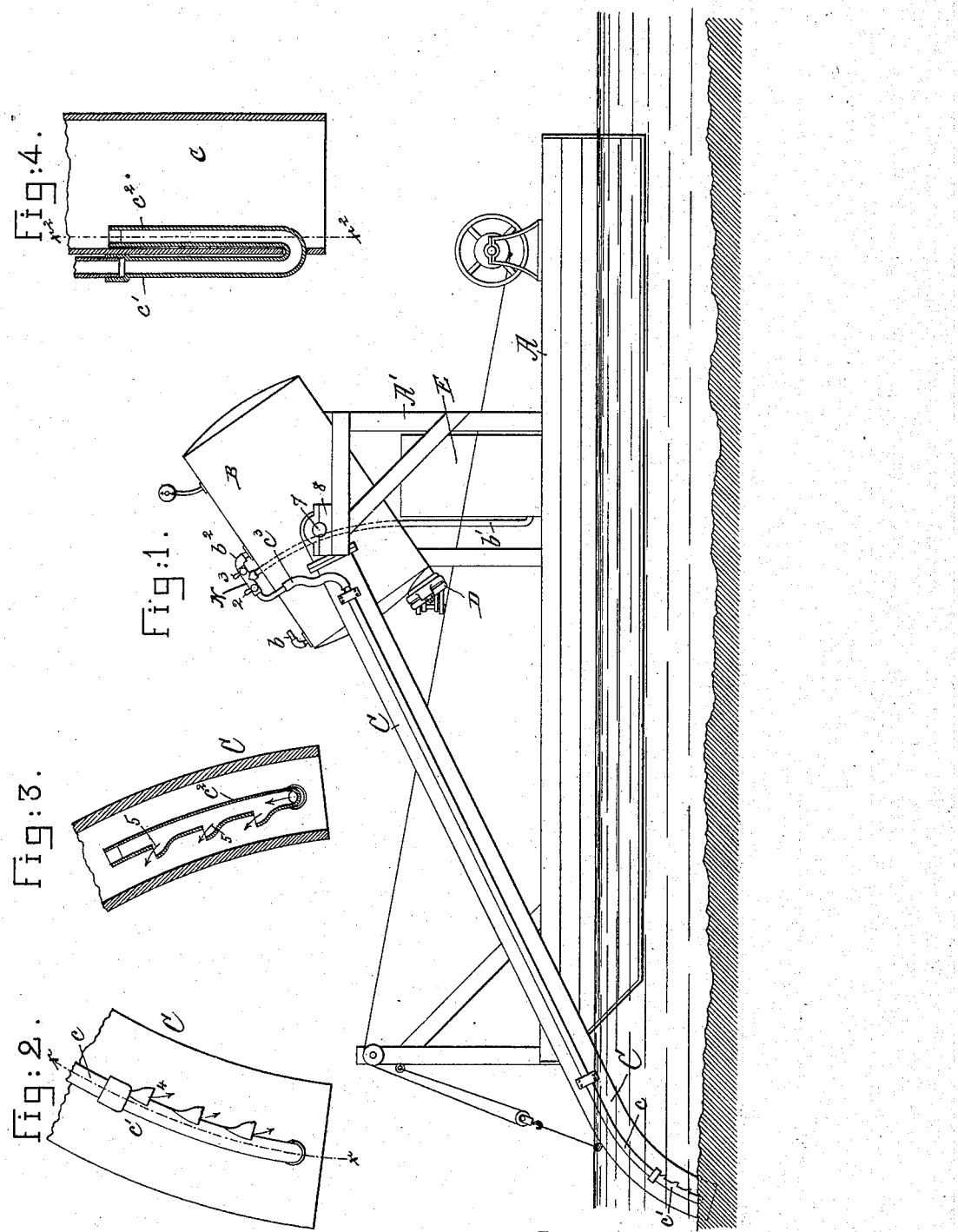
Witnesses.
Inventor.

(No Model.) 2 Sheets—Sheet 2.
A. C. WHITTIER.
DREDGE.
No. 322,231. Patented July 14, 1885.
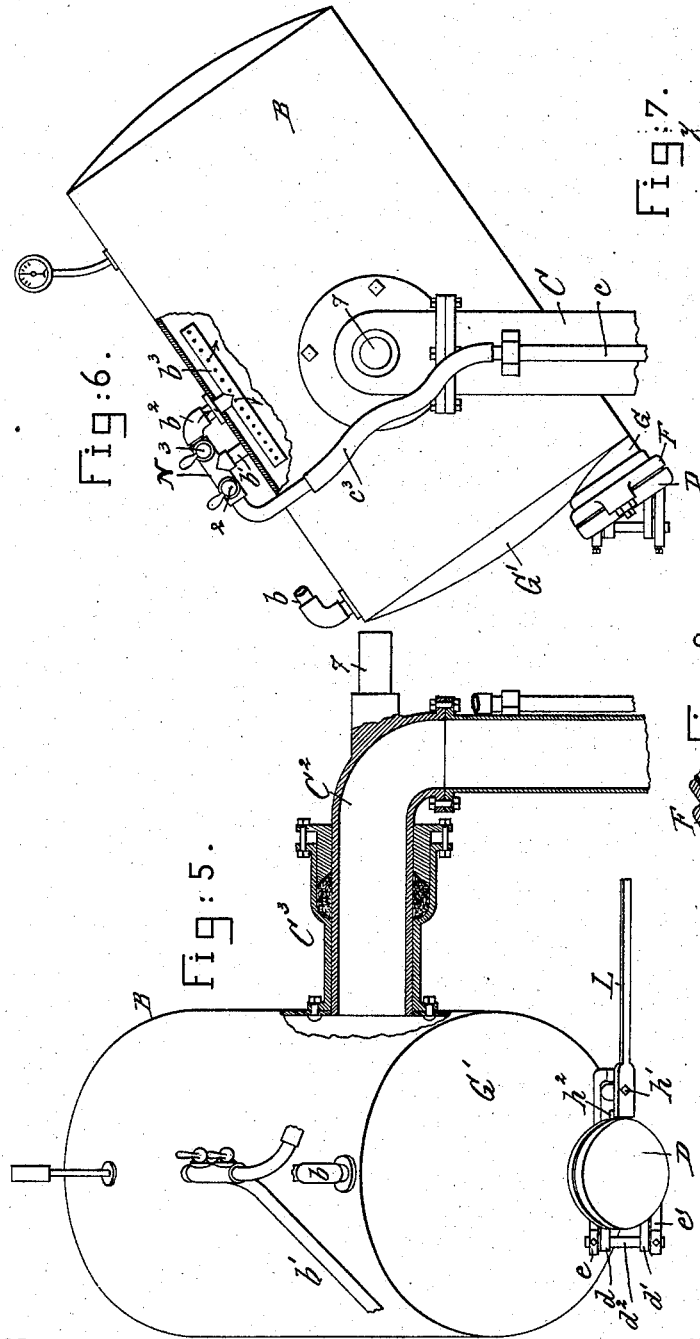
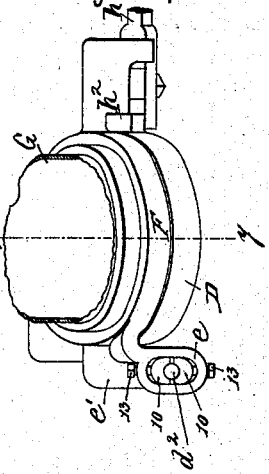
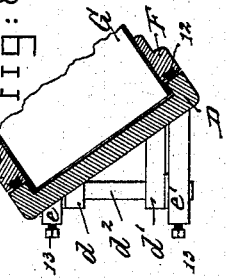
Witnesses.
Arthur Lepperton,
John F. C. Primhert.
Inventor.
Abel C. Whittier.
By Crosby & Gregory Attys.

UNITED STATES PATENT OFFICE.

ABEL CHARLES WHITTIER, OF BOSTON, MASSACHUSETTS.

DREDGE.

SPECIFICATION forming part of Letters Patent No. 322,231, dated July 14, 1885.

Application filed February 2, 1885. (No model.)

*To all whom it may concern:*

Be it known that I, ABEL C. WHITTIER, of Boston, county of Suffolk, State of Massachusetts, have invented an Improvement in Dredges, of which the following description, in connection with the accompanying drawings, is a specification, like letters on the drawings representing like parts.

In that class of apparatus employed in dredging wherein the material to be taken up and removed is lifted by atmospheric pressure into a vacuum-chamber great difficulty has been experienced in correctly presenting the mouth of the draft-pipe to the material to be raised in different depths of water, and also considerable difficulty has been experienced by the packing of the material in and about the mouth of the draft-pipe.

Various means have been heretofore devised for meeting these difficulties; and the present invention relates to certain improvements in such devices.

The first objection alluded to I have overcome by pivoting the draft-pipe with relation to the vacuum-chamber, a connected part of the said draft-pipe, as herein shown, being extended into a packed sleeve secured to the vacuum-chamber on one side and extended on the other side as a journal secured in the framing in which the vacuum-chamber is supported and aiding in sustaining said chamber; and the second objection I have overcome by providing the draft-pipe with a pressure-pipe having one or more outlets and located near the end of the draft-pipe both outside and inside the same, the said pressure-pipe being so shaped and constructed, as hereinafter more particularly set forth and claimed, as to deliver water under strong pressure against and into the material outside the draft-pipe and inside the draft-pipe, the direction of the discharge of the said water being such as to facilitate the passage of the material into the draft-pipe.

Figure 1 in side elevation represents a scow provided with a dredging apparatus embodying my invention; Fig. 2, a detail of the end of the draft-pipe with the pressure-pipe outside of it; Fig. 3, a sectional detail in the line $x\ x^2$, Fig. 4, of the end of the draft-pipe with the pressure-pipe within it; Fig. 4, a sectional view of Fig. 2 in the dotted line $x\ x$, looking toward the left. Fig. 5 is a partial elevation and section of my improved dredger detached from the scow; Fig. 6, a right-hand side elevation of Fig. 5; Fig. 7, a detail in top view of the door detached, and Fig. 8 is a section of Fig. 7 in the line $y\ y$.

The scow A, of usual construction, has upon it suitable timbers, A', to support the vacuum-chamber B in inclined position, so that the material forced therein through the draft-pipe C by atmospheric pressure may be discharged from the lower end of the said chamber through the door D, to be described.

The steam used in the vacuum-chamber enters the same through a pipe, $b$, in connection with a boiler or steam-generator, and the water used to condense the steam in the chamber, and also to supply the pressure-pipe $c$, is supplied by a pipe, $b'$, connected with a strong tank, E, containing water under the desired pressure. The pipe $b'$ enters a T-fitting, N, having cocks 2 3, one in each branch of the said T-shaped fitting. A prolongation of pipe $b^2$ from the T-shaped fitting, by proper elbows, leads the water into the sprinkler $b^3$ within the vacuum-chamber, while the other end of the T-shaped fitting has connected with it the pressure-pipe $c$, extended along the side of the draft-pipe C in suitable guides, as shown in Fig. 1, the said pressure-pipe having a U-shaped nozzle, the legs $c'\ c^2$ of which rest one outside and the other inside the draft-pipe, as shown best in Fig. 4, the said nozzle being passed through a hole in the side of the draft-pipe at or near its lower end. The nozzle of the pressure-pipe has discharge-outlets 4 5, each one of which is so located as to aid in discharging the water therefrom in the direction to aid in the entrance of the material into the draft-pipe. The connection between the T-shaped fitting and the main body of the pressure-pipe is made through a section of flexible pipe, $c^3$.

The draft-pipe C, of any suitable length and curvature, has at its upper end a right-angled extension, $C^2$, (see Fig. 5,) which enters a packed sleeve, $C^3$, attached to the vacuum-chamber, passes through the said sleeve, and enters the said vacuum-chamber.

The right-angled projection of the draft-pipe has a journal, 7, which enters the box 8; the said journal and box and the packed sleeve serving as the pivotal supports for the draft-pipe, permitting the same to be lowered a greater or less distance to place the mouth of the draft-pipe in contact with the material to be forced through it by atmospheric pressure.

In practice the mouth of the draft-pipe is pressed into the material—usually mud, sand, or gravel—and at the same time the nozzle of the pressure-pipe is embedded into the material, so that the force through the mouths 4 5 of the said nozzle starts the material in the proper direction and prevents it from packing or sticking in the mouth of the draft-pipe.

Pivoting the draft-pipe as stated enables it to be readily adapted to material at the bottom of a stream or river or other spot covered by water, and that without regard to depth within the limits of the length of the pipe, and this is done while the vacuum-chamber is stationary.

The door D has a long lower ear, $d'$, and a short upper ear, $d$, through which is extended a pintle, $d^2$, the upper end of the latter entering between the two halves of a box, 10, in a slotted ear, $e$, attached to the door-frame F, while the lower end of the pintle enters a corresponding box in a longer ear, $e'$, of the said door-frame.

The door-frame F is properly secured upon a tubular projection, G, from the lower head, G', of the vacuum-chamber B, and the face of the frame next the door is provided with a packing, 12. To seat the door squarely against this packing, so that the door may be closed air and water tight, the boxes 10 are made adjustable by the screws 13.

The long and short ears on the door and on the door-frame permit the door to swing horizontally, and yet to stand in diagonal position when closed.

The door is provided with a suitable fastening-lever, $h$, pivoted at $h'$, and adapted by its short arm to co-operate with a projection, $h^2$, of the door, the said projection and that part of the lever $h$ to strike it being preferably cam-shaped.

I claim—

1. The combination and arrangement, substantially as shown and described, of the vacuum-chamber B and the packed sleeve $C^3$, rigidly attached to the side thereof and opening directly thereinto, with the draft-pipe C, the right-angled extension $C^2$, secured to said draft-pipe and rotatable within said sleeve, and the journal 7, projecting from said extension and borne in boxes 8 of the supporting-frame, whereby the dredged material has an unobstructed, free, and direct inlet into said chamber, and an additional support for the chamber provided, as set forth.

2. The vacuum-chamber and draft-pipe, combined with a pressure-pipe, a sprinkler within the chamber, and a U-shaped nozzle opening inside and outside the draft-pipe, a T-fitting, N, provided with cocks, and a water-supply to control the supply to the sprinkler and nozzle, substantially as shown and described.

3. The draft-pipe provided with the pressure-pipe $c$, terminating in a U-shaped nozzle, having one leg outside the draft-pipe with downward openings, and the other leg passed through an opening into said draft-pipe and having upward openings, substantially as shown and described.

4. The vacuum-chamber and the door-frame having long and short ears, and the door having long and short ears, and the pintle, combined with adjustable boxes for the pintle, substantially as described.

In testimony whereof I have signed my name to this specification in the presence of two subscribing witnesses.

ABEL CHARLES WHITTIER.

Witnesses:
G. W. GREGORY,
B. J. NOYES.